(12) United States Patent
Bosch et al.

(10) Patent No.: US 8,739,306 B2
(45) Date of Patent: May 27, 2014

(54) SYSTEM AND METHOD FOR ACCESSING PRIVATE DIGITAL CONTENT

(75) Inventors: Hendrikus G.P. Bosch, Aalsmeer (NL); Vladimir Y. Kolesnikov, Jersey City, NJ (US); Sape Mullender, Amsterdam (NL); Koen Daenen, Haacht (BE); Bart Antoon Rika Theeten, Sinaa-Waas (BE)

(73) Assignee: Alcatel Lucent, Paris (FR)

( * ) Notice: Subject to any disclaimer, the term of this patent is extended or adjusted under 35 U.S.C. 154(b) by 0 days.

(21) Appl. No.: 13/508,559

(22) PCT Filed: Nov. 23, 2010

(86) PCT No.: PCT/EP2010/068027
§ 371 (c)(1),
(2), (4) Date: Jun. 7, 2012

(87) PCT Pub. No.: WO2011/067139
PCT Pub. Date: Jun. 9, 2011

(65) Prior Publication Data
US 2012/0246743 A1  Sep. 27, 2012

(30) Foreign Application Priority Data

Dec. 4, 2009 (EP) .................................... 09306182

(51) Int. Cl.
*G06F 21/00* (2013.01)
(52) U.S. Cl.
USPC ................................ 726/29; 380/277; 705/51
(58) Field of Classification Search
USPC ......................................................... 726/29
See application file for complete search history.

(56) References Cited

U.S. PATENT DOCUMENTS

| 7,260,224 | B1 * | 8/2007 | Ingle et al. ..................... 380/279 |
| 7,565,526 | B1 | 7/2009 | Shaw et al. |
| 7,661,128 | B2 * | 2/2010 | Chen et al. ......................... 726/5 |
| 2002/0054139 | A1 * | 5/2002 | Corboy et al. ................ 345/804 |
| 2003/0093691 | A1 * | 5/2003 | Simon et al. .................. 713/201 |
| 2006/0155997 | A1 | 7/2006 | Fritzges et al. |

FOREIGN PATENT DOCUMENTS

EP  2012460  1/2009

* cited by examiner

*Primary Examiner* — Gilberto Barron, Jr.
*Assistant Examiner* — Devin Almeida
(74) *Attorney, Agent, or Firm* — Carmen Patti Law Group, LLC

(57) ABSTRACT

Method for providing access to private digital content installed on a content server C(s), wherein a content manager server C(a) has a number of clients potentially interested in the private content; the method comprising the following steps performed at the content management server C(a):
  establishing a first communication channel with a client C(b) of the number of clients;
  receiving a query for private digital content from the client C(b) and sending an appropriate response, causing the client to establish a second communication channel with the content server;
  establishing a secure session with the content server C(s) over the first and second communication channel;
  establishing a new session key for the secure session and transmitting said new session key to the client C(b), so that the client can obtain the queried private digital content from the content server as if the client is the content management server.

20 Claims, 3 Drawing Sheets

SYSTEM AND METHOD FOR ACCESSING PRIVATE DIGITAL CONTENT

TECHNICAL FIELD

The present invention relates to a system and method for accessing private digital content.

BACKGROUND

PeCMan is a web application maintaining a list of web objects (data) in the form of URLs (references) with user-provided tags (information). These tags are then used to allow the original contributor (principal user) of the information to (re-)find the references and data, or to share the information and data with others (participant users). These participants can be friends, family, or generally groups of people. The operating model of PeCMan is that PeCMan only maintains the references and tags, and that the referred to objects themselves are retrieved by an application executing on the user's host. Thus the procedure for a participant user is to enter a few tags to PeCMan, PeCMan matches the tags to its information and returns the references to the user, whereupon the user will try to obtain the referred to data.

The PeCMan method for obtaining information from the web works well for publicly available data but fails for private shared data. Private shared data are references to objects that are stored behind, e.g. a password protected web-site. In this case, a user needs to login into the web service offering the referred to data. This is reasonably straightforward if the owner of the referred to data is the same user that is looking for the data. However, sharing private data with participants is a challenge and can only be realized if the principal owner of the data can provide the participant with the credentials for the service. According to the prior art, to support private non-shared and shared content, the principal PeCMan server typically stores the user credentials with the URL that is being pointed at. If private content is being addressed, a participant PeCMan client sets up a communication channel to a PeCMan server, which then establishes a connection to the storage provider on behalf of the participant PeCMan client, i.e. the PeCMan server acts as proxy for the participant PeCMan client. The downside of this method of data sharing in PeCMan is that all private data are transmitted through the PeCMan proxy. This means that PeCMan can become a bottleneck for accessing private content.

SUMMARY OF THE INVENTION

According to embodiments of the invention, there is provided an improved method and system for enabling a content management server to establish a secure tunnel to a remote content server, authorizing itself by providing certain credentials, typically the user ID and password, establishing a new session key for the tunnel and signalling a client, typically present inside a user equipment, with the newly established session key to enable the client to continue the conversation with the content server as if the client is the content management server.

According to an embodiment of the invention there is provided a method for providing access to private digital content installed on a content server, wherein a content manager server has a number of clients potentially interested in the private content. The method comprises the following steps performed at the content management server:
establishing a first communication channel with a client of the number of clients;
receiving a query for private digital content from the client and sending an appropriate response; this will typically be a trigger for the client to establish a second communication channel with the content server;
establishing a secure session with the content server over the first and second communication channel;
establishing a new session key for the secure session and transmitting said new session key to the client C(b).

Typically, before establishing the new session key, a data request will be sent to the content server through the secure session established over the first and second communication channel, wherein e.g. login credentials are provided in case of a secure content server.

This embodiment of the method of the invention will allow the client to obtain the queried private digital content from the content server as if the client is the content management server.

A content management server in the context of the present invention has to be interpreted in the broad sense referring to any server capable of managing for example public and/or private shared and/or private unshared digital content of a plurality of users, such as pictures, video's, etc. The content itself can be stored locally or at a remote location. Examples of such a content management server are simple content management servers, such as used by content providers like Flickr, YoutTube, etc, any type of content aggregators such as PeCMan, SecondBrain, iGoogle, any types of owner's proxies, proxies with selective proxy functionality, etc.

A content server in the context of the present invention typically refers to a secure content server, and can for example be a secure Web-server. Other examples are a local disc with file sharing capabilities, any computer having installed thereon a server program so that the computer functions as a content server, etc.

According to a preferred embodiment the establishing of the secure session consists in establishing any one of the following secure tunnels: a SSL/TLS tunnel, an ESP tunnel. Further, the establishing of the first and/or second communication channel preferably consists in establishing a first and/or second TCP/IP session.

According to a preferred embodiment the web server maintains a client authentication mechanism enabled for SSL/TLS, wherein the establishing of the secure session with the content server comprises authenticating the client node.

According to another embodiment of the invention there is provided a method for obtaining private digital content by a client of a content management server, which private content is installed on a content server. This method comprises the following steps performed by the client:
establishing a first communication channel with the content management server;
sending a query for private digital content to the content management server;
establishing a second communication channel with the content server; said query will typically cause the content management server to set up with the content server a secure session over the first and second communication channel, and to send a data request to the content server through said secure session;
receiving a new session key established for the second secure session; and
obtaining the queried private digital content from the content server using the new session key.

This method allows the client to obtain the private digital content as if the client is the content management server.

According to a possible embodiment a first secure session is established between the client and the content management server; and the new session key is received through said first secure session. In such an embodiment the secure session over the first and second communication channel can use the first secure session.

Further the invention relates to a content management server for organizing private digital content of a plurality of clients. According to an embodiment thereof the content management server is adapted to establish a secure session with the content server through concatenated channels comprising a first communication channel between the content server and a client and a second communication channel established between said client and the content management server, after having received a query for private digital content from said client, to send a data request to the content server through the secure connection, and to establish a new session key for the secure session and transmit said new session key to the client C(b).

Further the invention relates to a system for accessing private digital content, comprising:

a content management server;

a content server with digital private content;

a number of clients; wherein a client is adapted to receive a new session key and to use it for obtaining digital private content from the content server.

Finally the invention relates to a computer program product comprising computer-executable instructions for performing any of the above disclosed methods, when the program is run on a computer.

The accompanying drawings are used to illustrate presently preferred non-limiting exemplary embodiments of the present invention. The above and other advantages of features and objects of the invention will become more apparent and the invention will be better understood from the following detailed description when read in conjunction with the accompanying drawings in which.

Figure 1:
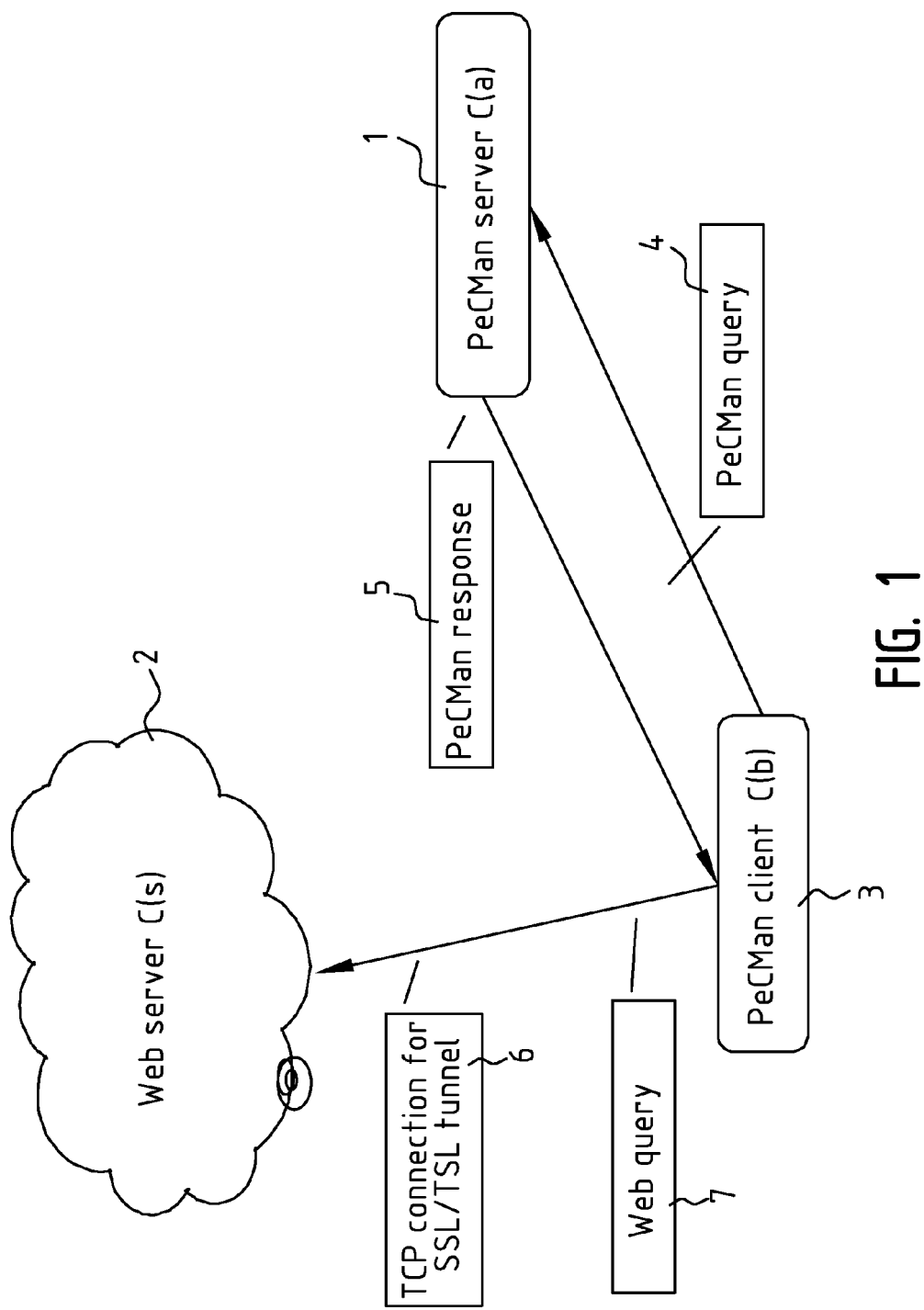
FIG. 1 illustrates an embodiment of a system according to the invention using a PeCMan system.

An exemplary embodiment of the invention will be illustrated below referring to a Personal Content MANagement (PeCMan) server as the content management server, but the skilled person will understand that the invention is applicable to any type of content management server (including owner's proxies) as defined above. PeCMan is a web tool that organizes user's digital content such as documents, pictures, videos, etc. FIG. 1 shows a schematic view of the PeCMan architecture as used in an embodiment of the present invention. A user interacts with the PeCMan server 1 using a client 3 (e.g. a web client, a desktop client or a client on a PDA, etc.) via which the user can e.g. add, remove or tag documents. An incoming request 4 from a client 3 is received by the PeCMan server 1 to be processed by the system. The system further comprises a metadata section (not shown) for storing metadata extracted from the documents or user-generated in the form of tags.

Users can for example upload URLs in PeCMan, semantically tag the information with free-format tags and later find that information back by querying PeCMan with the same tags. Since multiple URLs can be tagged with the same tags, PeCMan enables a user to organize all objects that are kept on a plethora of storage providers (e.g. web servers, home stores or mail servers) through one logical location akin a "virtual drive".

PeCMan recognizes three kinds of references: public, private non-shared and private shared content. Public content are URLs pointing at publicly available web sources. Accessing such content does not require user credentials, which implies that one can easily share such content with whomever is interested in that content. When public information is shared between users, PeCMan simply sends the requested URLs directly to the requesting or secondary PeCMan client and the secondary PeCMan client retrieves the content through e.g. WebDAV or HTTP.

Private content is typically content that can only be accessed through a secured location, typically a secured website (i.e. storage providers). To access secured storage providers 2, a web client 3 first establishes a secure connection 6 e.g. through SSL/TLS, and then provides the user credentials (typically a user-ID and password) to authenticate the user. After a user is authenticated, a web client 3 can access privately stored content via web queries 7. Typically inside the addressed web server 2 a state is allocated that is associated with the communication channel. This state indicates to the web server 2 that the requesting web client 3 has authenticated itself.

According to the prior art, to support private non-shared and shared content, PeCMan typically stores the user credentials with the URL that is being pointed at. If private content is being addressed, a secondary PeCMan client 3 sets up a communication channel to PeCMan 1, which then establishes a connection to the storage provider 2 on behalf of the secondary PeCMan client, i.e. the PeCMan server 4 acts as proxy for the secondary PeCMan client 3. This proxy maintains the secure connection to the web server 2 and is also the one that provides the user credentials to the storage provider 2. PeCMan does this for both shared and non-shared private content references.

The downside of this method of data sharing in PeCMan for private content is that all data associated with the objects pointed at are transmitted through the PeCMan proxy. This means that PeCMan can become a bottleneck for accessing private content and that if charges are associated with data transfers through PeCMan, the PeCMan operator may incur hefty fees for offering private content. Further, executing the proxy in the realm of the web client is typically not an option since that would imply that user credentials of users need to be shared with the secondary PeCMan client.

An alternative approach for accessing privately shared content is disclosed in European patent application No. 09 305 500.2 in the name of Applicant.

The difference between that patent and this patent is that the former relies that all participants support OAUTH, while this patent disclosure enables the establishment of delegated tunnels without the use of this new standard. In other words, SSL/TLS delegation can be used on web servers that do not use the new OAUTH standard.

Figure 2:
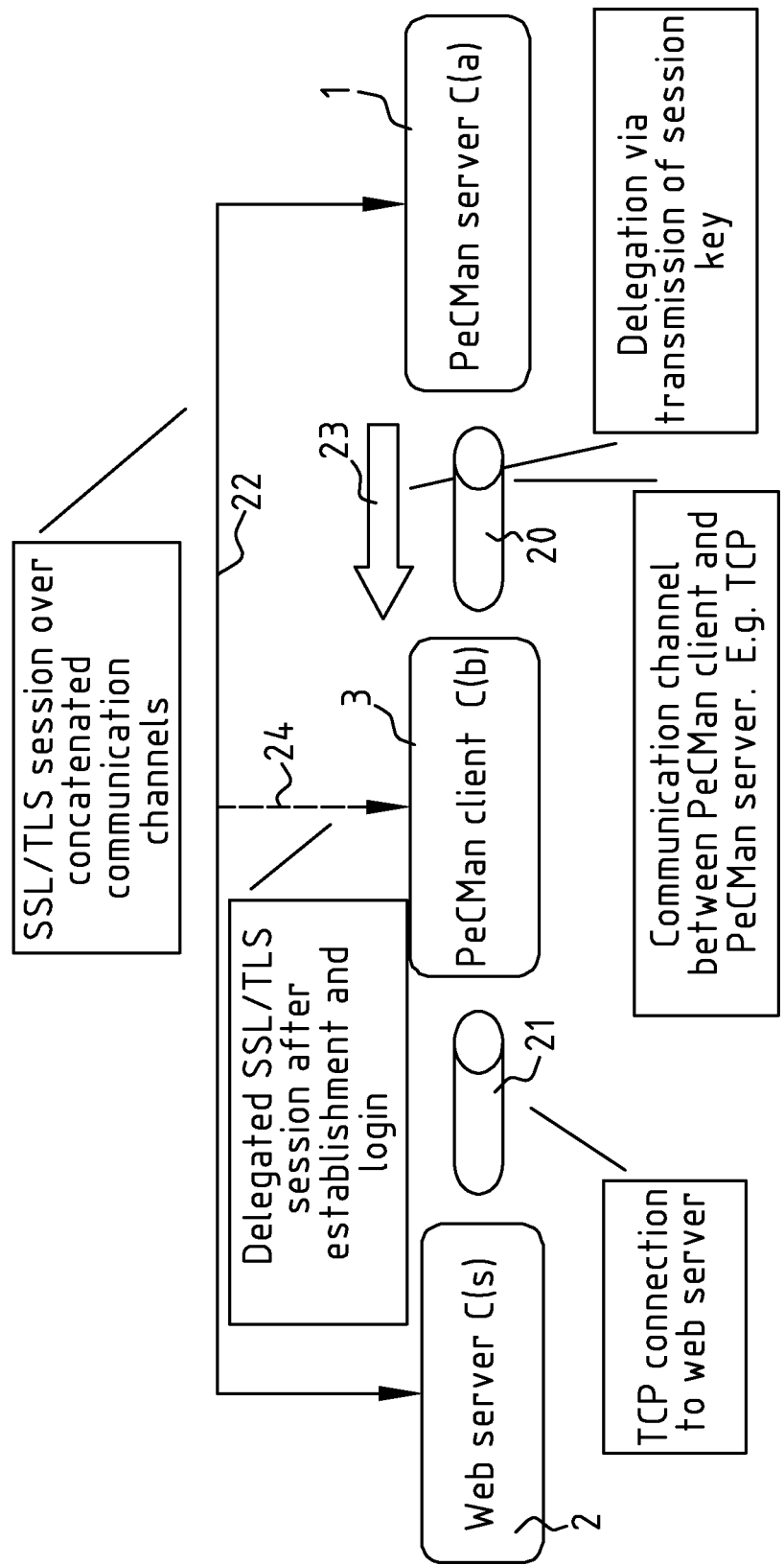
FIG. 2 illustrates the structure of the communication system used in an embodiment of the method and system of the invention.

In the following discussion the PeCMan server 1 will often be referred to as C(a), and the PeCMan client operating in user equipment (phone, Personal Computer, etc.) will often be referred to as C(b). According to an embodiment of the invention the PeCMan server 1 holds on to user credentials and establishes SSL/TLS sessions with web servers 2, and once the PeCMan server has logged in on a web server 2, it delegates the SSL/TLS tunnel to C(b). How this can be implemented will be further explained with reference to FIGS. 2 and 3.

Figure 3:
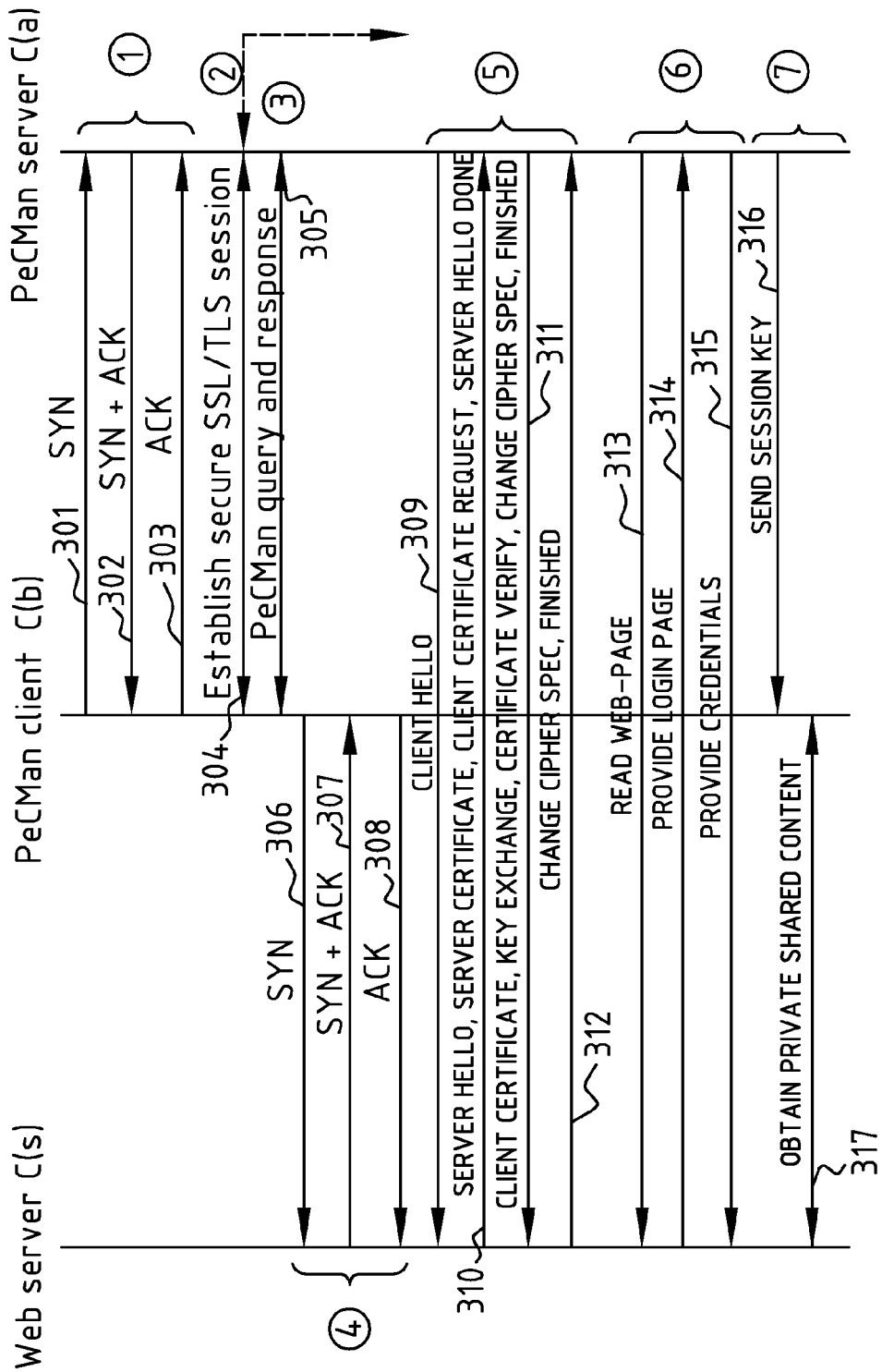
FIG. 3 illustrates a call flow according to an embodiment implementing the method of the invention.

FIG. 3 illustrates an embodiment implementing the method of the invention. FIG. 3 shows an exemplary signalling flow in which seven phases can be distinguished for the establishment and delegation of a SSL/TLS session between a PeCMan server C(a), a PeCMan client C(b) and a web server C(s).

In a first phase, the PeCMan client-server communication channel is set up, see steps 301-303 of FIG. 3. This first phase typically executes when the PeCMan client C(b) is started and establishes a first communication with the PeCMan server C(a). First a communication channel 20 is established between the PeCMan client C(b) and the PeCMan server C(a), see FIG. 2. Typically TCP endpoints record the remote IP address of the respective correspondent node and maintain protocol state variables on each end of the connection. Given that TCP sessions cannot relocate easily between correspondent nodes and that the eventual communication channel is required between C(s) and C(b), a further TCP session 21 will typically be established between C(b) and C(s), see further below (third phase). Although the figure shows the establishment of a TCP session between two entities, the skilled person will understand that other communication channels can be applicable here.

In a second phase, a secure communication channel is established between the PeCMan client C(b) and the PeCMan server C(a) using the communication channel, in particular the TCP session established in the first phase. The details of the establishment of the secure communication channel are omitted in the figure, but those steps can e.g. be similar to the steps of the fifth stage which is described in detail below. According to a possible embodiment, an encryption protocol providing security for communications over networks is used, such as the Secure Sockets Layer (SSL) or the Transport Layer Security (TLS) protocol (see RFC 5246). Typically, a SSL/TLS session is used with client and server authentication. However, the skilled person will understand that alternate secure tunnel mechanisms would work equally well, such as an Encapsulating Security Payload (ESP) tunnel as defined in RFC 4303. ESP is a protocol used in the Internet Protocol Security (IPsec) suite for securing Internet Protocol (IP) communications by authenticating and encrypting each IP packet of a data stream. ESP provides origin authenticity, integrity, and confidentiality protection of packets.

In a third phase (step 305), the PeCMan client C(b) queries the PeCMan server C(a) for content. The PeCMan server matches the query to its database and returns a set of URL's that match the query to the PeCMan client. The PeCMan client C(b) will then select one or more URL's for retrieval. In the example it is assumed that at least one of the URL's points to privately shared content on web server C(s), that PeCMan server C(a) holds the user credentials for that web server, and that the communication to the web server holding the content is secured by a SSL/TLS session. According to a preferred embodiment, the query and response requests 305 may be transmitted over the secure channel set up in the second phase, or may be transmitted in the clear over a separate communication channel (not shown).

In a fourth stage, a communication channel is established between the PeCMan client C(b) and the remote web server C(s), see steps 306-308. According to a possible embodiment, this communication channel is based on a simple TCP communication channel.

In a fifth stage (steps 309-312 in FIG. 3), a SSL/TLS session 22 (see FIG. 2) is established between the web server C(s) and the PeCMan server C(a) through the TCP communication channel between the C(s) and C(b) established in the fourth stage and the TCP communication channel established between C(b) and C(a) in the first stage. Details about the exchanged messages can be found in RFC 5246. Note that arrows 310, 311 and 312 do not represent the sending of one single message, but the exchanging of a number of messages as detailed in RFC 5246. In other words the key exchange takes place between the C(s) and C(a) through the TCP endpoint of C(b), through a secured end-2-end channel using two concatenated TCP sessions, wherein it is made impossible for C(b) to capture the web-server credentials. This is a key stage of this embodiment of the invention which will allow the PeCMan client C(b) to continue the conversation with C(s) as if it is C(a) using the new session key established for the tunnel.

The communication between C(b) and C(a) may be transmitted over the SSL/TLS tunnel established in the second phase, or may be transmitted over a non-secured communication (not shown). According to a possible embodiment, client based authentication may be enabled. In such a case, the certificate of C(b) could be used, in which case C(b) needs to sign the last message of the SSL/TLS protocol (steps 309-315). According to an alternative, a new derived certificate that speaks for C(b) may be used by C(a). This will be further elucidated below.

During the fifth stage, typically both ends of the communication channel authenticate each other through the regular SSL/TLS authentication mechanisms. For this the web server C(s) maintains a certificate held in a PKI such as a X.509 certificate as defined in RFC4210. As explained above, if client authentication is enabled for SSL/TLS (which is not by default), the web server authenticates the corresponding node, in the present case C(b). However, since the SSL/TLS session is first established between C(s) and C(a), C(a) needs C(b)'s certificate. Since C(b)'s certificate is private for C(b) and it is not desirable to share C(b)'s private signing key with C(a), as explained above, three options exist:

the regular SSL/TLS establishments procedure is followed, but C(a) re-uses C(b)'s certificate when C(s) requests it. According to a possible embodiment C(a) requests C(b) to sign the final SSL/TLS protocol message of step 311 before C(a) transmits the message to C(s). According to an alternative embodiment, the certificate of C(b) is copied to C(a) before the procedure starts; note that this copying can be performed out-of-band, e.g. long before the procedure of FIG. 3 starts; or a new certificate is used that speaks for C(b) and is held by C(a). Such a technique is e.g. disclosed in Butler Lampson et al, entitled "Authentication in Distributed Systems: Theory and Practice", ACM Trans. Computer Systems 10, 4, Nov. 1992, pp 265-310. This new certificate is created and signed by C(b) and used when SSL/TLS executes the client side authentication procedure. The web server C(s) can then verify the authenticity of the new certificate by traversing the key hierarchy starting from the derived certificate held by C(a). Also, typically the new certificate is copied to C(a) before the procedure starts.

C(a) can request C(b) to sign a certificate with C(b)'s private key, e.g. in cases where certificate chaining is not allowed. In the latter case, C(s) can verify C(a)'s certificate through C(b)'s public key.

In a sixth stage, once the SSL/TLS initiation procedure has completed, data requests can be sent back and forth between the web server C(s) and the PeCMan server C(a), through C(b)'s TCP session. According to a preferred embodiment, the web server is a typical secured web server, and the PeCMan server C(a) provides the user credentials on the remote web server C(s) by interaction with the web server through the SSL/TLS session set up in the fifth stage. Even though all communication goes through the PeCMan client C(b), this client cannot decipher the messages as it has no knowledge of the used session key for the SSL/TLS tunnel. The web server will send a web page enabling the user to provide its credentials to login to the web server, see step 314. In this case, the PeCMan server C(a) provides the user ID and password for the web server and sends this information to C(s) through the secured SSL/TLS tunnel maintained in part by C(b)'s TCP session, see step 315. Since C(b) does not know the session key for the SSL/TLS tunnel, it can only act as an intermediary and copy the data verbatim between the end points. The PeCMan server C(a) typically remains active on the SSL/TLS tunnel to complete the entire login procedure.

The seventh stage consists in the delegation of the SSL/TLS tunnel from C(a) to C(b). First the PeCMan C(a) and the web server C(s) establish a new session key (not shown in FIG. 3), and then the PeCMan server C(a) transmits all parameters required for the PeCMan client C(b) to maintain the secure tunnel, the newly established session key being typically an important parameter. Note that it is important to calculate a new key to avoid leakage of the web server credentials to C(b). The parameters required for the PeCMan client C(b) to maintain the secure tunnel include the parameters to cipher/decipher the SSL/TLS session. It is assumed that the web server does not transmit data on the SSL/TLS session during this delegation, since data is only expected when the client requests data. The communication channel required for the delegation is the secure communication channel established in the second phase above, since the transmitted ciphering material must typically not be transmitted in the clear. Once the PeCMan client has deciphering material, it can obtain privately shared data directly from the web server C(s) as if the request is transmitted form the PeCMan server C(a).

While the principles of the invention have been set out above in connection with specific embodiments, it is to be clearly understood that this description is merely made by way of example and not as limitation of the scope of protection which is determined by the appended claims.

The invention claimed is:

1. A method for providing access to private digital content installed on a content server, wherein a content manager server has a number of clients potentially interested in the private digital content, the method comprising the steps of:
   establishing, via the content management server, a first communication channel with a client of the number of clients;
   receiving, via the content management server, a query for private digital content from the client and sending an appropriate response, causing the client to establish a second communication channel with the content server;
   establishing, via the content management server, a secure session via a Transport Layer Security (TLS) tunnel with the content server over the first communication channel and the second communication channel; and
   establishing, via the content management server, a new session key for the secure session and transmitting the new session key to the client, so that the client can obtain the queried private digital content from the content server as if the client is the content management server.

2. The method of claim 1, further comprising the step of sending, via the content management server, a data request to the content server through the secure session established over the first communication channel and the second communication channel.

3. The method of claim 1, wherein the establishing of the secure session further comprises establishing one of the following secure tunnels: the Transport Layer Security (TLS) tunnel or an Encapsulating Security Payload (ESP) tunnel.

4. The method of claim 1, wherein the establishing of the first communication channel and/or the second communication channel further comprises establishing a first and/or a second TCP/IP session.

5. The method of claim 1, wherein the content server maintains a client authentication mechanism enabled for the Transport Layer Security (TLS), and wherein the establishing of the secure session with the content server further comprises authenticating a client node.

6. The method of claim 5, wherein the authenticating of the client node is made possible by re-using the client's certificate when requested by the content server by requesting the client to sign the final TLS protocol message before transmitting the final TLS protocol message to the content server.

7. The method of claim 5, wherein the authenticating of the client node is made possible by using a new certificate signed by the client and held by the content management server, such that the content server can verify the authenticity of the new certificate.

8. A method for obtaining private digital content by a client of a content management server, where the private digital content is installed on a content server, comprising the steps of:
   establishing, via the client, a first communication channel with the content management server;
   sending, via the client, a query for the private digital content to the content management server;
   establishing, via the client, a second communication channel with the content server, the query causing the content management server to set up with the content server a secure session via a Transport Layer Security (TLS) tunnel over the first communication channel and the second communication channel;
   receiving, via the client, a new session key established for the second secure session; and
   obtaining, via the client, the queried private digital content from the content server using the new session key as if the client is the content management server.

9. The method of claim 8, wherein the query further causes the content management server to send a data request to the content server through the secure session.

10. The method of claim 8, wherein a first secure session is established between the client and the content management server, and the new session key is received through the first secure session.

11. The method of claim 10, wherein the secure session over the first communication channel and the second communication channel uses the first secure session.

12. The method of claim 1 wherein the appropriate response comprises a set of URLs that match the query to the client.

13. The method of claim 1 wherein the private digital content is selected from the group consisting of documents, pictures and video.

14. The method of claim 1 wherein the private digital content is stored at a remote location.

15. The method of claim 1 wherein the client is selected from the group consisting of a web client, a desktop client and a client on a PDA.

16. The method of claim 1, further comprising the step of transmitting, via the content management server, cipher/decipher parameters to the client to enable the client to maintain the TLS tunnel.

17. A content management server for organizing private digital content of a plurality of clients, adapted to establish a secure session with a content server via a Transport Layer Security (TLS) tunnel after having received a query for private digital content from a client, wherein the client is adapted to establish a second communication channel with the content server, and establish a new session key for the secure session and transmit the new session key to the client, so that the client can obtain the queried private digital content from the content server as if the client is the content management server.

18. The content management server of claim 17, wherein the content management server is a content aggregator.

19. A system for accessing private digital content, comprising:

the content management server according to claim 17;
    a content server with the private digital content; and
    a number of clients, wherein a client is adapted to receive the new session key and to use the new session key to obtain the private digital content from the content server.

20. A non-transitory computer-readable medium having computer-executable instructions for performing the method of claim 1.

* * * * *